United States Patent [19]

Morgan et al.

[11] 4,339,623
[45] Jul. 13, 1982

[54] MONOMER/SOLVENT PURIFICATION

[75] Inventors: Peter J. Morgan, West Wellow; Kenneth I. Wyllie, Milford on Sea, both of England

[73] Assignee: The International Synthetic Rubber Company, Limited, Southampton, England

[21] Appl. No.: 228,611

[22] Filed: Jan. 26, 1981

[30] Foreign Application Priority Data

Jan. 28, 1980 [GB] United Kingdom ................. 8002776

[51] Int. Cl.³ ............................................. B01D 3/36
[52] U.S. Cl. ............................ 585/867; 203/DIG. 19
[58] Field of Search .................. 203/DIG. 19, 75, 78, 203/82, 84, 93, 94, 98, 70; 585/810, 840, 867

[56] References Cited

U.S. PATENT DOCUMENTS

| | | | |
|---|---|---|---|
| 2,729,599 | 1/1956 | Ohsol et al. | 203/70 |
| 2,729,600 | 1/1956 | Beach | 203/70 |
| 3,681,202 | 8/1972 | Funkhouser | 203/DIG. 19 |
| 4,166,774 | 9/1979 | Wagner | 203/DIG. 19 |

Primary Examiner—Frank Sever
Attorney, Agent, or Firm—Cushman, Darby & Cushman

[57] ABSTRACT

A purification process for monomers and solvents used in the production of polymers by solution polymerization comprises supplying impure monomer and solvent to a distillation column which rejects light and heavy impurities from the top and bottom respectively and which dries the monomer-solvent mixture by azeotropic distillation, and withdrawing a pure monomer solvent vapor as a side stream from a point intermediate the top and bottom of the column.

12 Claims, 1 Drawing Figure

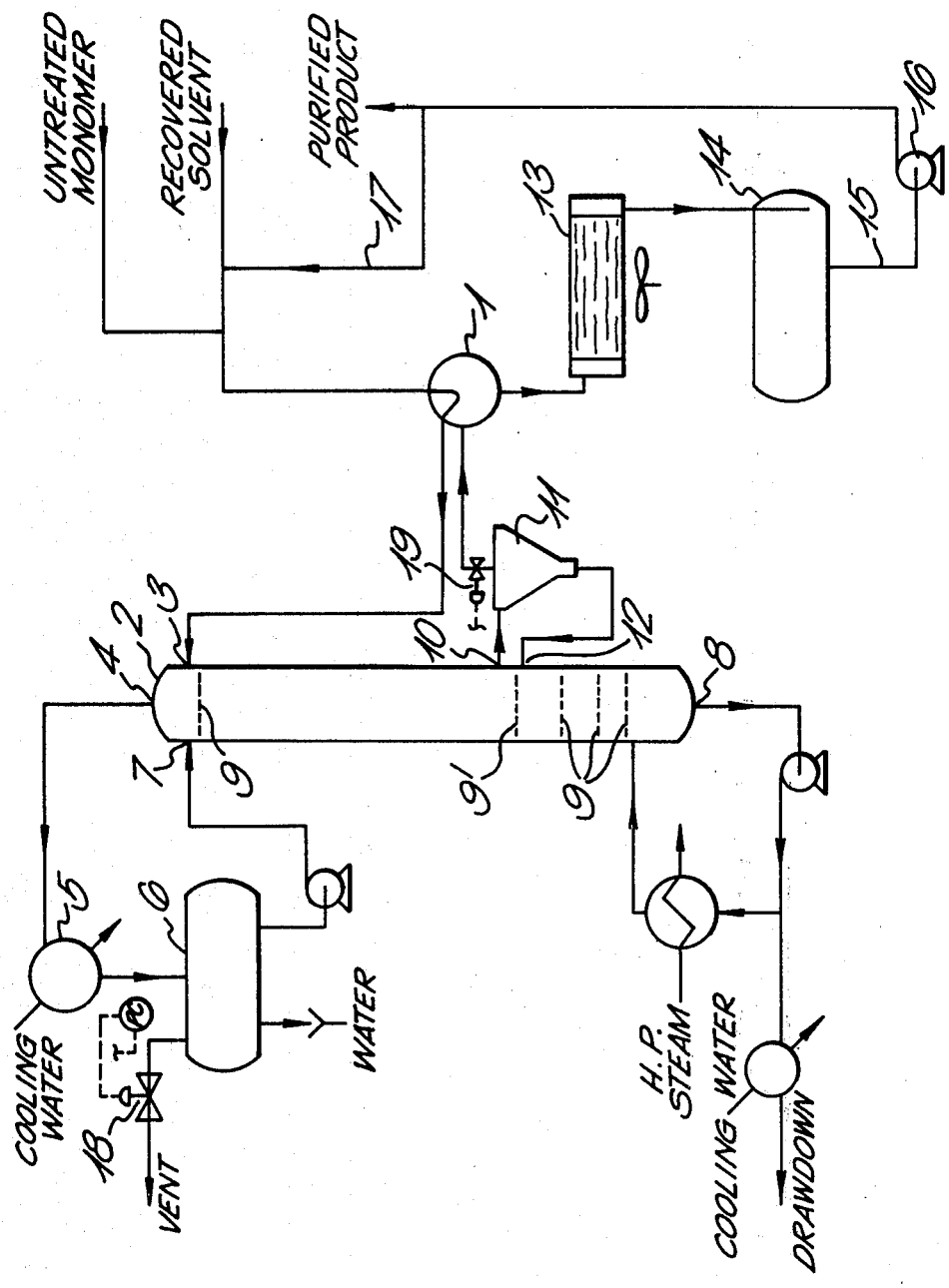

MONOMER/SOLVENT PURIFICATION

DESCRIPTION

This invention relates to polymerisation purification. In particular it relates to the purification of monomers and solvents in the production of polymers by solution polymerisation.

Solution polymerisation processes have been known for many years. One difficulty in carrying out such processes is that the catalysts used are very sensitive to moisture, oxygen and other impurities. Therefore, the monomers and solvents used have to be carefully purified. Fresh monomers from storage contain autopolymerisation inhibitors, moisture and other impurities. The solvent used in the polymerisation is, as far as possible, recycled from the desolventizing step of the polymer recovery stage. A by-product of the polymerisation process is a low molecular weight polymer which normally remains in the solvent stream after this step. Apart from this low molecular weight polymer, or oil, the solvent for recycle is wet and contains traces of unreactive light impurities, unreacted monomers, antioxidant and other impurities.

Prior processes for purification of monomers and solvents have involved several steps, namely, chemical treatment, multicolumn distillation and drying, with consequent high energy requirements.

According to the present invention a purification process for monomers and solvents used in the production of polymers by solution polymerisation comprises supplying impure monomer and solvent to a distillation column which rejects light and heavy impurities from the top and bottom respectively and which dries the monomer-solvent mixture by azeotropic distillation, and withdrawing a pure monomer solvent vapour as a side stream from a point intermediate the top and bottom of the column.

The invention also includes the distillation column and associated apparatus arranged to carry out the aforesaid purification process.

By using the vapour side stream concept of the invention, it is possible to achieve simultaneously, drying and purification of both monomer and solvent to remove light (especially acetylenes) and heavy impurities to give a pure mixed feed product in one single distillation column. A major advantage is that it is possible to carry out the process with inhibitor present during distillation (thus ensuring safe operation) but this is not present in the monomer vapour product since it is non-volatile. Previously three columns have been required, one for removal of heavy impurities, one for removal of light impurities and one for drying the butadiene/solvent mix.

The net advantages are, therefore, lower capital cost, lower running costs (reduced energy requirement) safer operation and reduced downtime.

Quite apart from this, the need for a caustic wash of the monomer is eliminated, removing the problem of disposal of caustic effluent.

The invention will now be particularly described with reference to the drawing which is a flow sheet of a particular embodiment of the process of the invention. The invention specifically includes the distillation column and associated apparatus arranged according to this drawing.

Referring to this flow sheet, fresh monomer stream is combined with the untreated recovered solvent stream in ratios predetermined by the polymerisation process conditions which are required. The combined stream is preheated in an interchanger, 1, using the heat from the sidestream withdrawn from distillation column, 2. The preheated stream is supplied to the top of distillation column, 2, via entry port, 3. The distillation column, 2, is heated by high pressure steam. Water, azeotrope and light ends are removed from the top of the column, via port, 4, and are supplied, via condenser, 5, to reflux drum, 6. The water, azeotrope and light ends separate on cooling in reflux drum, 6, and material for reflux to keep the column in balance is reintroduced to the column, 2, via port, 7. Water which builds up in the base of the reflux drum, 6, is drained automatically. A feed of autopolymerisation inhibitor is maintained to the reflux drum, 6, to ensure clean and safe column operation.

Heavy impurities such as low molecular weight oils, antioxidants and any unreacted heavy monomers used in the polymerisation process (e.g., styrene) are rejected from the base of the column, 2, via port, 8.

Distillation column, 2, comprises a series of trays, 9, which may be, for example, 10 to 30 in number, in this case 13. Dry, pure monomer-solvent mixture is withdrawn as a vapour from the side of distillation column, 2, via port, 10. The optimum position of this port, 10, is determined by the column conditions and the purity of the vapour moving up the column. In the particular embodiment of our invention, port, 10, is situated immediately above the fourth tray from the base, shown in the drawing as 9′. The withdrawn vapour passes through swirl pot, 11, which separates any liquid spray carryover and returns it to the column, via, port, 12. The spray is preferably returned to the column tray immediately below the point of withdrawal of the vapour, (i.e., column tray, 9′,) but if this is not possible it may be returned to the next tray below. From swirl pot, 11, the monomer-solvent stream is condensed by heat exchange in interchanger, 1, and further cooled, if necessary, using, for example, air coolers, 13, and collected in product receiver vessel, 14. Purified product may then be withdrawn for use as required via conduit, 15, and pump, 16. A recycle line, 17, is provided for recycling the sidestream to the feedline for use in start-up, in emergency and to keep up the flow rate of material supplied to the column in the event that the turndown rate falls below the operational level, for example, 50%.

The conditions of column operation are controlled by various factors, for example, column pressure and temperature feed and withdrawal rates, all of which may be integrated by means of an appropriately programmed computer. Column pressure is controlled by means of a pressure regulation valve, 18, venting to the waste gas main. By adjustment of this valve, 18, the light end rejection rate of the column may be regulated. The rate of removal of heavy impurities from the base of the column (drawdown) is adjusted to maintain a steady base temperature/pressure relationship but heavy impurities normally comprise some 30% to 40% of this drawdown stream. Efficiency of separation is controlled by the column reflux rate, usually some 20% to 40% of column feed rate. Column boil-up is controlled automatically by the column base level. The rate of withdrawal of sidestream via port, 10, is regulated by an in-line valve, 19, which is updated from the reflux drum level. Control of the column is therefore on a constant inventory basis and, by careful adjustment, the system is operable without hunting.

The process of the invention is particularly suitable for the purification of butadiene monomer and a solvent such as n-hexane which may in addition contain sizeable quantities of C5 paraffins as well as C5 and C6 cycloparaffins. However, the invention is not limited to the purification of such a monomer-solvent mixture. Thus by adjustment of the operating conditions, the column and associated apparatus may be used to purify other hydrocarbon monomers and solvents such as for use in preparing olefin polymers and copolymers (for example, EP and EPDM rubbers and polypropylene). It is, however, particularly applicable to the purification of conjugated diene monomers having, for example, 4–10 carbon atoms and a hydrocarbon solvent, especially a saturated hydrocarbon solvent.

In a typical butadiene purification process the column and associated apparatus shown in the drawing are operated under the following conditions. Monomer (1,3 butadiene) and solvent (substantially n-hexane) are supplied to the interheater, 1, at a flow rate of 25 and 75 imperial gallons per minute respectively. The temperature of the mixture at port, 3, is 100° F. The column is maintained with a base temperature of 250° F. and a temperature at the top of 135° F. The temperature immediately below the fourth tray is 245° F. and above it, 170° F. The drawdown rate of 2 imperial gallons per minute and the pressure at valve, 18, is 50 psig at 60° F. Recycle rate to port, 7, is 40 imperial gallons per minute. Under these conditions, purified mixed feed product may be withdrawn at a flow rate of 98 imperial gallons per minute via port, 10.

We claim:

1. A Purification process for monomers, inhibitors and solvents used in the production of polymers by solution polymerisation consisting essentially of employing a single distillation column, supplying impure monomer and solvent to said distillation column which rejects light and heavy impurities from the top and bottom respectively and which dries the monomer-solvent mixture by azeotropic distillation, and withdrawing a pure, inhibitor-free monomer solvent vapour as a side stream from a point intermediate the top and bottom of the column.

2. A process according to claim 1 wherein the monomer is an olefin or a conjugated diene.

3. A process according to claim 2 wherein the monomer is butadiene.

4. A process according to claim 1 wherein the heavy impurities include an antioxidant.

5. A process according to claim 4 wherein the heavy impurities include styrene.

6. A process according to claim 4 wherein the monomer is an olefin or a conjugated diene.

7. A process according to claim 6 wherein the monomer is butadiene.

8. A process according to claim 7 wherein the solvent is n-hexane.

9. A process according to claim 7 wherein the impure monomer and solvent supplied to the distillation column contain a non-volatile autopolymerisation inhibitor, which inhibitor is present in the liquid phase but not in the vapour phase during the distillation.

10. A process according to claim 1 wherein impure monomer and solvent and any purified monomer-solvent mixture is supplied to the top of the column.

11. A process according to claim 10 wherein the heavy impurities include an antioxidant.

12. A process according to claim 1 wherein the solvent is n-hexane.

* * * * *